US011263567B2

(12) United States Patent
Wicker et al.

(10) Patent No.: US 11,263,567 B2
(45) Date of Patent: Mar. 1, 2022

(54) DEMAND AWARE REPLENISHMENT SYSTEM (71) Applicant: Target Brands, Inc., Minneapolis, MN (US)

(72) Inventors: Patrick Wicker, Minneapolis, MN (US); Abhilash Koneri, Minneapolis, MN (US); Venkata Putrevu, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 451 days.

(21) Appl. No.: 16/026,915

(22) Filed: Jul. 3, 2018

(65) Prior Publication Data

US 2020/0012983 A1 Jan. 9, 2020

(51) Int. Cl.
*G06Q 10/06* (2012.01)
*G06Q 10/08* (2012.01)

(52) U.S. Cl.
CPC ... *G06Q 10/06315* (2013.01); *G06Q 10/0875* (2013.01)

(58) Field of Classification Search
None
See application file for complete search history.

(56) References Cited

U.S. PATENT DOCUMENTS

| | | | |
|---|---|---|---|
| 6,789,252 B1 | 9/2004 | Burke et al. | |
| 7,475,024 B1 | 1/2009 | Phan | |
| 7,664,757 B1 * | 2/2010 | Boesjes | G06Q 30/0635 707/792 |
| 7,737,857 B2 | 6/2010 | Ebert et al. | |
| 7,969,306 B2 | 6/2011 | Ebert et al. | |
| 8,321,303 B1 | 11/2012 | Krishnamurthy et al. | |
| 8,972,285 B2 | 3/2015 | Soldate | |
| 9,280,755 B2 | 3/2016 | Tsai et al. | |
| 10,306,068 B1 | 5/2019 | Chadha et al. | |
| 10,401,816 B2 | 9/2019 | Ganapathi et al. | |
| 10,511,683 B2 | 12/2019 | Busatta et al. | |
| 2009/0259509 A1 | 10/2009 | Landvater | |
| 2010/0138281 A1 | 6/2010 | Zhang et al. | |
| 2014/0100769 A1 | 4/2014 | Wurman et al. | |
| 2015/0006427 A1 | 1/2015 | Notani et al. | |
| 2015/0379449 A1 * | 12/2015 | Gopinath | G06Q 10/087 705/7.25 |
| 2016/0350787 A1 | 12/2016 | Taylor et al. | |
| 2017/0004422 A1 | 1/2017 | Todd et al. | |

(Continued)

OTHER PUBLICATIONS

Zhi-tao et al, Research on Construction Strategy of Enterprise Information Sharing in Supply Chain, 2010 (Year: 2010).*

(Continued)

*Primary Examiner* — Mohamed N El-Bathy
(74) *Attorney, Agent, or Firm* — Merchant & Gould P.C.

(57) ABSTRACT

Methods and systems for managing supply chains are disclosed. Replenishment of items within retail stores and distribution centers is optimized to respond to real-time demands. One method includes receiving demand signals corresponding to a sold inventory items and evaluating those demand signals against real-time inventory positions and demand forecasts for that particular inventory item to determine whether to replenish the inventory item and how much inventory to replenish. A router service for assessment of such demand signals is also disclosed.

17 Claims, 8 Drawing Sheets

(56) References Cited

U.S. PATENT DOCUMENTS

| | | |
|---|---|---|
| 2017/0039512 A1 | 2/2017 | Jones et al. |
| 2017/0200106 A1* | 7/2017 | Jones ............... G06Q 10/06315 |
| 2018/0053153 A1* | 2/2018 | Mai .................... G06Q 10/0875 |
| 2018/0150793 A1* | 5/2018 | Lert, Jr. ............. G06Q 10/0833 |
| 2020/0013000 A1 | 1/2020 | Wicker et al. |

OTHER PUBLICATIONS

Non-Final Office Action issued in U.S. Appl. No. 16/026,980, dated Jun. 5, 2020, 22 Pages.
Non-Final Office Action issued in U.S. Appl. No. 16/026,980, dated Jun. 16, 2021, 12 Pages.

* cited by examiner

DEMAND AWARE REPLENISHMENT SYSTEM

TECHNICAL FIELD

The present disclosure relates generally to methods and systems for managing supply chains. More particularly, the present disclosure describes a system architecture for managing the replenishment of inventory within a retail organization at a per unit level.

BACKGROUND

Retail supply chains typically involve the transfer of inventory from vendors to warehouses to retail stores. Such supply chains typically analyze the amount of inventory transferred among locations (between vendors and warehouses, warehouses to retail stores, and retail stores to customers) to determine whether to replenish the moved inventory (including inventory sold at the retail store). However, inventory is typically moved in large bundles or pallets. Thus, a large bundle of inventory may be moved to replenish sold or transferred inventory, even when less than an entire bundle is necessary. This type of inventory transfer oftentimes leads to overstock situations in which inventory is left sitting in the back room of a retail store, where space is limited and expensive. Additionally, the retailer may be forced to mark down certain products just to reduce stored inventory, leading to reduced sales revenue.

SUMMARY

In summary, the present disclosure relates to methods and systems for managing replenishment of inventory in a retail supply chain. Various aspects are described in this disclosure, which include, but are not limited to, the following aspects.

In one aspect, a system for managing supply chain operations in an enterprise having a retail store is described. The system comprises: a computing system including a processor, and a memory communicatively coupled to the processor, the memory storing instructions executable by the processor to receive a demand signal corresponding to a sold inventory item; determine whether to route the demand signal to an event processing engine; determine whether additional inventory is required; and based on a determination that additional inventory is required, generate a transfer order.

In another aspect, a method of managing inventory replenishment at a retail store by an event processing engine is described. The method comprises: receiving a demand signal corresponding to a sold inventory item; receiving, for the retail store, a demand forecast for the sold inventory item; determining whether additional inventory is required; and based on a determination that additional inventory is required, generate a transfer order.

In yet another aspect, a non-transitory computer-readable storage medium comprising computer-executable instructions is disclosed which, when executed by a computing system, cause the computing system to perform a method of managing inventory replenishment at a retail store by an event processing engine is provided. The method comprises receiving a demand signal corresponding to a sold inventory item; receiving, for the retail store, a demand forecast for the sold inventory item; determining whether additional inventory is required; and based on a determination that additional inventory is required, generate a transfer order.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for managing inventory within a supply chain. In particular, the present disclosure relates to replenishing inventory at a per unit level rather than a per bundle level, using a system that is aware of demand at any given time. As will be described herein, such replenishment is performed at a per unit level from a flow center to a retail store, wherein the flow center represents an intermediate node in the supply chain having high throughput so that daily demands can be met. This demand aware system receives demand signals from various nodes within the supply chain, wherein each demand signal signifies a change in demand. Notably, the demand aware system described herein can function alongside an existing, or legacy supply chain system so that items not suited for the demand aware system can still be managed by an existing supply chain system.

The demand aware system works in a supply chain management system that may be implemented for a collection of retail stores that also operates an online ordering system. The supply chain management system operates to monitor and manage inventory levels in a plurality of nodes. Nodes can include retail stores and warehouses. Warehouses serve to store inventory and also function as distribution centers. The distribution centers can have particular purposes such as a receive center for receiving products from vendors and preparing them for distribution to other nodes, or a flow center for holding inventory stock for distribution to retail stores and individual customers. The supply chain management system determines how much inventory to hold at each node and manages transfers of inventory in order to achieve the preferred amounts of inventory at each node. The movements of inventory can be based on expected demand as well as reactions to actual demand from customers.

The methods and systems described herein provide an event-driven architecture for real-time replenishment of inventory on a per unit level. The system is both proactive and reactive. Demand forecasting is utilized to proactively anticipate customer demand at each location for each item. In addition, the system reacts to each individual sale to replenish stock as needed based on actual demand. The same stocks of inventory are utilized to fulfill needs for both in-store and online sales. Inventory stocks are continually rebalanced throughout the supply chain in order to position items in locations where they are mostly likely to be needed to reduce shipping time and storage time and to maximize sales. The methods and systems described herein provide efficiencies in supply chain management that unexpectedly allow for both a reduction in the amount of inventory that is stored at any time while also being able to respond more quickly to customer demand.

Figure 1:
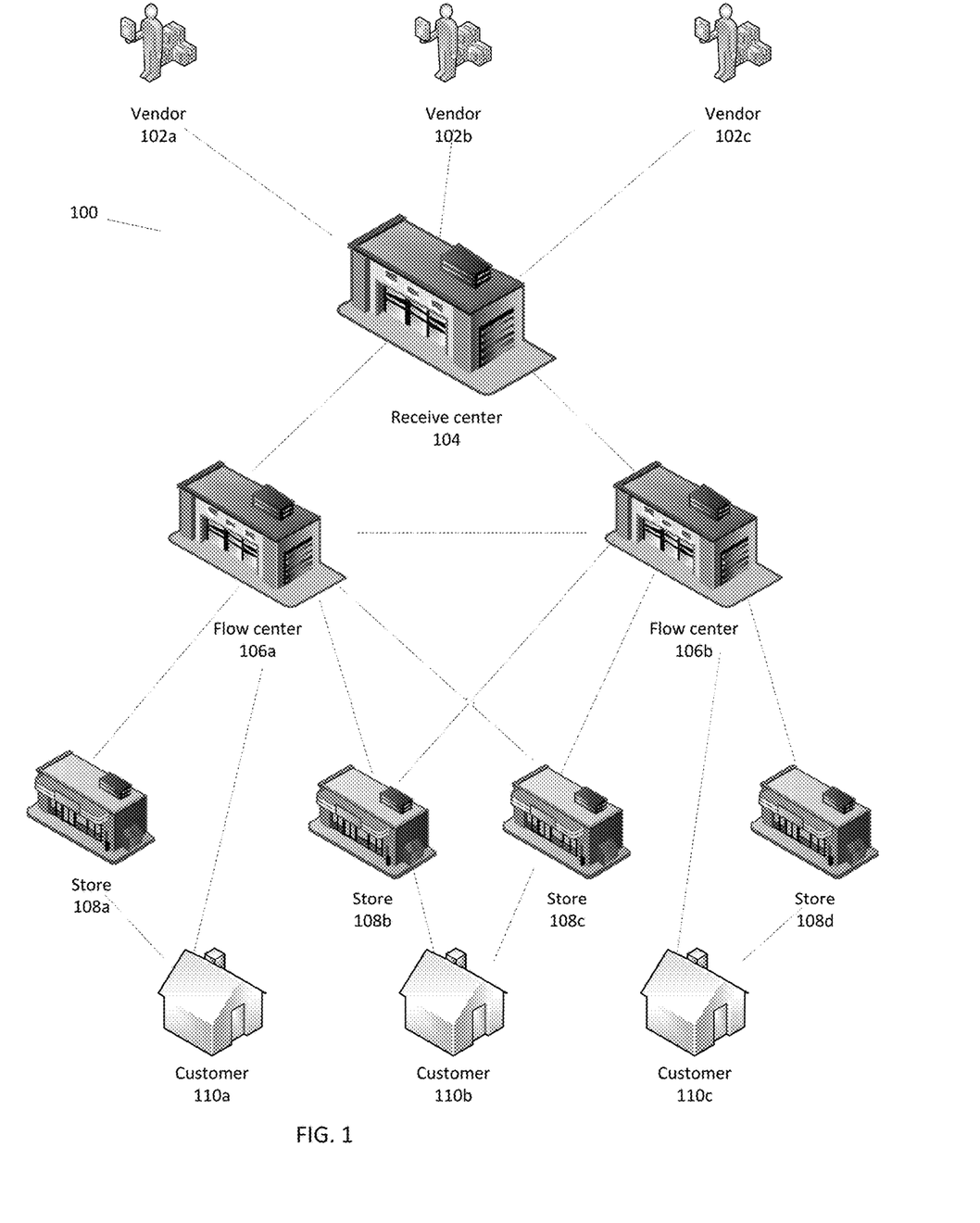
FIG. 1 illustrates a schematic diagram of an example supply chain for a retail enterprise.

FIG. 1 illustrates a schematic diagram 100 of an example supply chain for a retail enterprise. The diagram 100 illustrates the flow of inventory from vendor 102 to customer 110. The inventory moves through various nodes to arrive at the customer. In this example, the nodes include a receive center 104, two flow centers 106a, 106b, four retail stores 108a, 108b, 108c, 108d, and three customer residences 110a, 110b, 110c. In practice, the supply chain could include many more nodes in different proportions. In some embodiments, there are not separate receive centers and flow centers. Instead, there may be one type of warehouse or distribution center for holding inventory before distributing to stores and customers. Arrows in the diagram indicate movement of inventory. Inventory will typically flow downward through the supply chain, but in some instances inventory may move between flow centers 106 or between retail stores 108. In some embodiments, inventory may even move from a flow center 106 to a receive center 104 or from a retail store 108 to a flow center 106.

Vendors 102 produce the items or products that will be sold by the retail entity. A purchase order is typically placed to request products from a vendor. In some instances, the vendor 102 will transport the ordered products to a receive center 104. In other instances, the retail entity arranges for the products to be picked up from the vendor 102 and transported to the receive center 104. Once at the receive center 104, the products are prepared for transportation to one or more flow centers. The products may arrive from the vendors in large groupings that need to be broken down.

A variety of products are then prepared for shipment to one or more flow centers 106. The flow centers 106 are typically positioned to enable quick shipment to one or more retail stores 108. At the flow centers 106, the products are further broken down into smaller units of measure for distribution to the retail stores. Each flow center 106 may supply inventory to multiple retail stores 108. In some instances, more than one flow center 106 will send inventory to a retail store 108. For example, in FIG. 1, flow center 106a distributes inventory to stores 108a, 108b, and 108c. Flow center 106b distributes to stores 108b, 108c, and 108d. In some instances, the products may be broken down into individual units in order to fill online orders that will be delivered directly to customers. In the example of FIG. 1, products are shipped directly from flow center 106a to a customer 110a and from flow center 106b to customer 110c.

Once products arrive at the retail stores 108, they are either stored in a back room or unpackaged for display on shelves. This inventory is available for in-store purchases, pick-up orders, or local delivery. Depending on the location of a customer ordering products online, the shipments of products could come from one or more retail stores 108. For instance, customer 110b could receive shipments of products from either store 108b or store 108c.

It is noted that, between receive centers 108, flow centers 106, and stores 108, there may be preexisting, predetermined delivery routes established. For example, there may be daily or weekly transit routes between a receive center and one or more flow centers. The receive center can provide to the flow centers the selection of individual items that are needed by stores 108 serviced by the one or more flow centers proximate to and/or servicing those stores. The flow centers can also have daily or other periodic transportation routes established to stores that are serviced, thereby ensuring prompt replenishment of items at stores in response to item sales.

In addition, the predetermined delivery routes can be used for various purposes. For example, in some situations, the predetermined delivery routes can be used to deliver products in various forms. As explained in further detail below, items distributed via the supply chain are tracked on an individual (per-item) basis; as such, items can be delivered to stores 108 in any convenient manner. In some example embodiments, items are tracked on an individual basis, but may be grouped at a flow center 106 to simplify restocking of the store 108, for example by placing together in a package a collection of individual items of different types but which may easily be stocked conveniently once those items arrive at a store 108. For example, goods that are located in a common department, row, or shelf of a store can be grouped and packed together at the flow center 106. Once those items reach the store 108, a restocking operation can restock each of the items in that shelf, row, or department easily. Still further, because items are packed and tracked on an individual basis at the flow center and sent to stores based, at least in part, on demand signals received from stores, the item collections are based on the number of items sold and therefore the restocking operation can provide a package of items that will fit on store shelves, rather than requiring additional backroom stocking and storage.

In the context of the present disclosure, a supply chain management system is provided that assists in coordination of product shipments among nodes of the supply chain, and uses inventory models to automatically rebalance inventory within the supply chain of the enterprise to ensure predicted and actual item demand from customers of the enterprise is fulfilled to a predetermined threshold success rate. The supply chain management system allows for balancing of items across the supply chain based on inventory and demand models, as well as real time demand signals, and performs automated generation of purchase and transfer orders throughout the supply chain based on such demand and lead time calculations between paints both within and external to the supply chain. Accordingly, as noted below, substantial advantages are realized using the methods and systems of the present disclosure.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders. In other embodiments, the systems and methods could operate for distribution channels that distribute supplies to multiple locations within a business rather than selling to individual customers. Regardless of the application, the systems and methods described herein are most beneficial when used to manage a supply chain for a plurality of nodes with the goal of increasing efficiency of inventory movement by responding to both proactive and reactive demand signals in real time.

Figure 2:
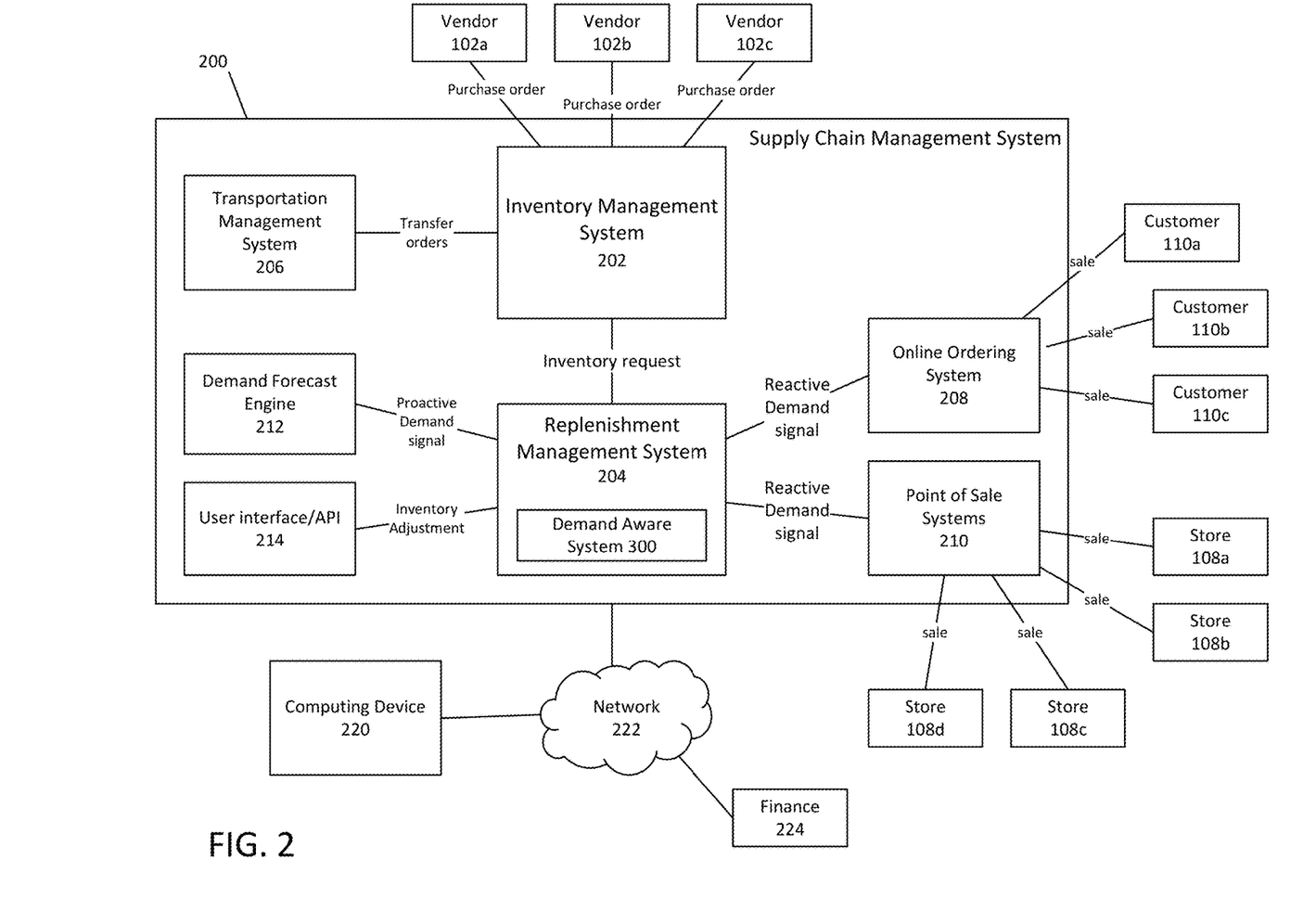
FIG. 2 illustrates a schematic diagram of an example supply chain management system.

FIG. 2 illustrates a schematic diagram of an example system 200 for managing a supply chain. The key components of the supply chain management system 200 are an inventory management system 202 and a replenishment management system 204. Together, the inventory management system 202 and replenishment management system 204 operate to monitor inventory levels across all nodes of a supply chain, determine if and when adjustments to inventory levels need to be made, and facilitate transport of inventory between nodes to respond to customer demand.

The inventory management system 202 receives inventory requests from the replenishment management system 204. In response to the inventory requests, the inventory management system 202 determines whether additional inventory is needed at one or more nodes within the supply chain to satisfy the request. Additional inventory may be transported to one node from another node if sufficient stock of the needed product(s) is available within the required timeframe within the supply chain. In such instances, transfer orders are issued to the transportation management system 206. If the inventory management system 202 determines that there is not sufficient stock of the requested products at another node or that transporting the products within the supply chain would be too costly or time consuming, additional stock is ordered from one or more vendors 102 through purchase orders issued from the inventory management system 202. The inventory management system 202 is further described with respect to FIG. 3.

The replenishment management system 204 receives demand signals from an online ordering system 208, one or more point of sale systems 210, and a demand forecast engine 212. The demand signals can be proactive or reactive. Proactive demand signals come from the demand forecast engine 212 and are generated by predicting expected customer demand for individual products on a day by day basis. Reactive demand signals come from sales made at the point of sale system 210 or through the online ordering system 208. The online ordering system 208 receives orders from customers 110 and coordinates fulfillment of those orders. The point of sale systems 210 record sales that are made at stores 108. The replenishment management system 204 also receives inventory adjustments from the user interface 214. Inventory adjustments are instructions received from a user to modify inventory levels at one or more locations or nodes within the supply chain. Inventory adjustments may be made for reasons other than expected or actual customer demand for particular items. The replenishment management system further includes the demand aware system 300. The replenishment management system 204 and the demand aware system 300 is further described with respect to FIG. 3.

Figure 3:
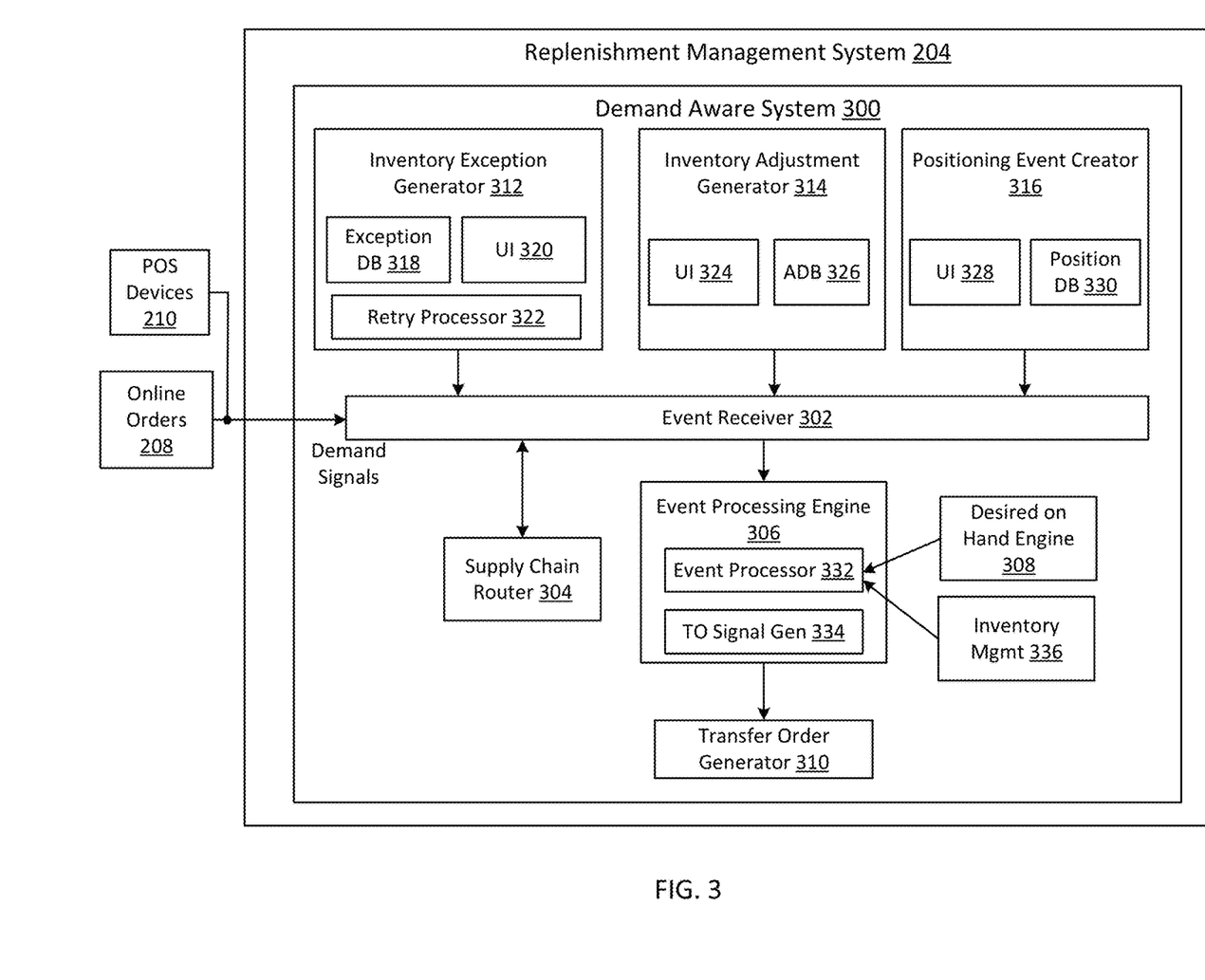
FIG. 3 illustrates a more detailed view of the replenishment management system described in FIG. 2.

As described herein, the demand aware system 300 solves overstock problems that arise when an entire bundle of product is sent to a store that will sell less than the bundle—thereby resulting in the need for markdowns and loss of revenue. In particular, the demand aware system 300 evaluates whether to send inventory to a particular retail store, when to send the inventory, and how much inventory to send. The demand aware system 300 therefore will send exactly that amount that is necessary to that retail store, based in part on how much inventory was already sold, any inventory adjustments made, how much inventory is forecasted to be sold, and how much inventory the retail store desires to have on hand. If less than an entire bundle is to be sent to a store, then bundles may be broken down at a receive center or a flow center before being sent to a downstream retail store. In some embodiments, the demand aware system 300 makes this assessment daily and in other embodiments the demand aware system 300 makes this assessment more or less frequently.

As will be described in further detail herein, the demand aware system 300 is aware of and reacts to the probability demand. When a sale occurs (i.e., a negative change in inventory), or when demand is forecasted, the demand aware system 300 may react by pushing more inventory to that particular store.

In some embodiments the supply chain management system 200 communicates with a computing device 220 through a network 222. The network 222 can be any of a variety of types of public or private communications networks, such as the Internet. The computing device 220 can be any network-connected device including desktop computers, laptop computers, tablet computing devices, smartphones, and other devices capable of connecting to the Internet through wireless or wired connections. In some instances, the supply chain management system 200 also communicates with a finance system 224 through the network 222.

Additional details regarding the overall supply chain management system are described in copending U.S. patent application Ser. No. 15/898,837, entitled "Method and System for Supply Chain Management", the disclosure of which is hereby incorporated by reference in its entirety.

FIG. 3 illustrates a more detailed diagram of the demand aware system 300 hosted by the replenishment management system 204. The demand aware system 300 includes an event receiver 302, a supply chain router 304, an event processing engine 306, a desired on hand engine 308, and a transfer order generator 310. The demand aware system 300 further includes systems that allow demand signals to be generated, including an inventory exception generator 312, an inventory adjustment generator 314, and a positioning event creator 316.

The event receiver 302 receives demand signals from systems external to the demand aware system 300 including online ordering systems 208 and point of sale systems 210. The event receiver 302 also receives demand signals from systems internal to the demand aware system 300 including the inventory exception generator 312, inventory adjustment generator 314, and positioning event creator 316. A demand signal indicates a change in inventory of a particular item. In particular, a demand signal indicates a change in demand for a particular product in inventory from anywhere within the supply chain (including warehouses, flow centers, and stores). Demand signals can represent, for example, changes in inventory because an item was sold, an item was moved from a warehouse to a flow center, inventory broke and needs to be replaced, etc. Each demand signal includes metadata that describes the item, including the item's Stock Keeping Unit (SKU) and the location of the change represented by the demand signal. In some embodiments, as will be described in more detail herein, the metadata may also include item information such as the item class and the department within which the item belongs.

As described herein, demand signals received from the online ordering system 208 and point of sale system 210 are considered reactive demand signals. These demand signals are generated in reaction to an item that is sold at a point of sale device or online. Such demand signals are sent to the event receiver 302.

The inventory exception generator 312 may generate demand signals representing one or more exceptions to inventory. The inventory exception generator 312 may include an exception database 318, a user interface 320, and a retry processor 322. The exception database 318 may store item numbers for items that may not be expected to be in inventory, but do not actually exist in inventory. As an example, the inventory system may list an item as being available at a particular store, however that item may have been moved or a customer may have picked up the item to purchase, and therefore that item would not actually be considered as available inventory. In some embodiments, the inventory exception generator 312 includes a user interface 320 that allows an employee to manually create such exceptions to indicate that inventory is lost or missing. The retry processor 322 may attempt to retry the inventory system to determine the location of the particular item (for example, if it was sold within a predetermined time period). If the item is not found within a predetermined period of time, that exception is added to the exception database 318. An exception added to the exception database 318 may generate a demand signal that is sent to the event receiver 302.

The inventory adjustment generator 314 may generate demand signals representing changes in inventory that are not due to a sale. For example, the inventory adjustment generator 314 may generate a demand signal when inventory is damaged, expires, or is somehow defective. Any one of these scenarios involves a reduction in inventory, requiring an assessment regarding whether that item should be replenished. In some embodiments, the inventory adjustment generator 314 includes a user interface 324 that allows an employee to input such adjustments into an adjustment database 326 to indicate that inventory needs to be adjusted based on any of the above-identified reasons. A demand signal generated by the inventory adjustment generator 314 is sent to the event receiver 302.

The positioning event creator 316 may generate demand signals representing changes in inventory as a result of inventory moving locations. For example, a bundle of product may be shipped from a warehouse to a flow center, where it is thereafter separated from the bundle into individual units. The positioning event creator 316 may generate one or more demand signals representing the movement such that the demand aware system 300 understands where that inventory is located. The positioning event creator 316 may further generate one or more demand signals representing the separation of the product from the bundle. In some embodiments, the positioning event creator 316 includes a user interface 328 that allows an employee to input such movements into position database 330 to indicate that inventory has moved. All such demand signals generated by the positioning event creator 316 are sent to the event receiver 302.

The event receiver 302 acts as a gatekeeper for all demand signals received from, for example, online orders 208, POS devices 210, the inventory exception generator 312, the inventory adjustment generator 314, and the positioning event creator 316. The event receiver 302 routes such demand signals to the supply chain router 304. As will be described in further detail herein, if it is determined that the particular demand signal can be processed by the event processing engine, the event receiver 302 may also route such demand signals to the event processing engine 306.

As described herein, the demand aware system 300 is an optimized supply chain system that may be built on top of an existing legacy supply chain system. Certain products may not be best suited to be processed by the event processing engine 306. In particular, some types of products may not be most efficiently shipped individually, but rather by bundle. Still further other types of products may not be best suited for processing, for example due to deficiencies in a supply chain with respect to perishable items, or certain hazardous materials. Still further, in some instances, organizations may elect to adapt a supply chain management system over time from a traditional supply chain system to a demand-aware based system such as the one disclosed herein. In such embodiments, those products may be controlled by an existing legacy supply chain system. Thus, the supply chain router 304 is a co-existent construct used to route the processing of a demand signal to either the event processing engine 306 such that replenishment of that item can be handled on a per unit basis, or it can be routed so that it is processed by a legacy supply chain system.

The supply chain router 304 functions to identify whether an item represented by the demand signal is processed by the event processing engine 306 or a legacy supply chain system. In other words, the supply chain router 304 functions to selectively route demand signals to the event processing engine 306 or to block those demand signals that should be processed by the legacy supply chain system. By having the ability to selectively route or block demand signals, the supply chain router 304 enables the ability for the replenishment management system 204 to work in conjunction with a legacy supply chain system. A retailer can therefore slowly phase out legacy supply chain systems as more demand signals can be processed by the event processing engine 306. In some embodiments, the supply chain router 304 determines whether to route the demand signal to the event processing engine 306 based on the item SKU provided in the demand signal metadata. Based on a determination that the demand signal should be processed by the event processing engine 306, the supply chain router 304 routes the demand signal to the event processing engine 306. In some embodiments, the supply chain router 304 routes the demand signal directly to the event processing engine 306 and in other embodiments the supply chain router 304 routes the demand signal to the event processing engine 306 through the event receiver 302. The supply chain router 304 is described in further detail with reference to FIGS. 4A and 4B.

The event processing engine 306 includes an event processor 332 and a transfer order signal generator 334. In some embodiments, the event processing engine 306 accepts demand signals from the supply chain router 304 or the event receiver 302 and also accepts inputs from the desired on hand engine 308. The desired on hand engine 308 identifies the demand forecast for each particular item, at each store, during a predetermined timeframe. In some embodiments, the desired on hand engine 308 obtains this demand forecast information from the demand forecast engine 212 shown and described with reference to FIG. 2. In addition to obtaining forecasted demand for an item, the desired on hand engine 308 also identifies optional additional inventory for each item that may be desired in a particular store. In one example, optional inventory in addition to the forecasted demand may be desired in order to stock shelves aesthetically. The desired on hand signal, which includes both forecasted demand and desired optional additional inventory, is passed to the event processing engine 306. This desired on hand signal relates to a particular timeframe, which may be one day or longer and may depend on the item. For example, items with short lifecycles or quick turnover may have a shorter timeframe. In other embodiments, the timeframe may depend on the time of year, or whether a particular promotional event or holiday is approaching.

The event processing engine 306 therefore accepts, at the event processor 332, demand signals from the supply chain router 304 (or event receiver 302) and desired on hand signals from the desired on hand engine 308. In some embodiments, the event processor 332 may also accept inputs from an inventory management system 336 that maintains current inventory levels at particular nodes in the supply chain. The inventory management system 336 may also provide the event processor 332 with lead-time information describing when new inventory may arrive in order to determine whether to ship new inventory to a particular retail store. In one example, if the earliest date on which the new shipment may arrive at the retail store is after the date for which the demand is forecasted, then the shipment may not be necessary. Moreover, if the earliest date on which the new shipment may arrive at the store falls on a date on which a lower demand is forecasted, then shipment would not be desired.

The event processor 332 uses these inputs to determine whether a transfer order must be generated. Generally, a transfer order may include any order to move inventory within the supply chain system. In an example, a transfer order may include an order to ship inventory to a particular store from a flow center or a warehouse, from a warehouse to a flow center, or even ship inventory from a warehouse to a customer.

In an example relating to generating a transfer order from a flow center (or warehouse) to a retail store, the event processor 332 may ascertain the last known total amount of inventory at the particular store from which the demand signal originated and subtract the unit of inventory sold represented by the converted demand signal (and in some embodiments, this may be an aggregated number of units represented by multiple demand signals) to arrive at the total number of inventory units currently at the particular store. The event processor 332 then evaluates the desired on hand amount to determine whether additional inventory must be shipped to that particular store. If the desired on hand amount is less than the total amount of inventory currently at the store, the event processor 332 generates a command to the transfer order signal generator 334 to generate a transfer order signal that is passed to the transfer order generator 310. In other words, if the amount of inventory currently at that store is less than desired (based on the unit(s) sold as identified by the demand signal, the forecasted demand for that item, and the optional additional desired inventory), then inventory in the exact amount corresponding to the difference is shipped to that store. Details regarding calculating desired inventory for each item at each location are provided in U.S. Patent Application No. 62/632,069, the disclosure of which is hereby incorporated by reference in its entirety.

In some embodiments, the event processor 332 may also take into consideration the cost of shipping the new inventory to the retail store. In one example, if the cost to ship the new inventory exceeds the potential profit of the sale of that item, then shipping the new inventory may not be desired.

If, alternatively, the desired on hand amount is greater than or equal to the total amount of inventory currently at the store, the event processor 332 does not generate a transfer order signal, thereby not prompting shipment to that particular store. In some embodiments, the event processor 332 queries an inventory database to determine the amount of inventory at the particular store from which the demand signal originated.

The transfer order generator 310 generates transfer orders that indicate movement of inventory. In some embodiments, inventory may be shipped from a flow center to the retail store, and in other embodiments, inventory may be shipped from a receive center, to a flow center, to the retail store. Yet in other embodiments, inventory may be shipped from a receive center directly to the retail store. In some embodiments, inventory may be shipped from multiple locations. In some embodiments, the transfer order generator 310 communicates with the inventory management system 202 of FIG. 2 to generate transfer orders.

Thus, the event processing engine 306 uses the change in inventory indicated by the demand signal and the desired on hand signal (which includes forecasted demand plus optional additional desired inventory) provided by the desired on hand engine 308 to determine whether a shift inventory (and how much) to a particular node within the supply chain is necessary. As described herein, existing supply chain systems only rely on replenishment information to determine whether to shift inventory to a particular retail store and the amount of inventory to shift would be based on the amount sold. In other words, supply chain systems only relied on replenishing the amount of inventory sold, without regard to evaluating the upcoming demand forecast for that particular item. Moreover, existing supply chain systems would only replenish entire bundles of product. Thus, if only one item is sold, it is likely that an entire bundle would be shipped to that store to replenish the one sold item. This inefficient process causes product to go unsold, leading to markdowns and loss of revenue. By contrast, the demand aware system 300 evaluates the amount sold (i.e., replenishment), and the forecasted demand for that item to determine whether it is even necessary to shift inventory to that store to replenish the item and how much inventory to shift.

Figure 4A:
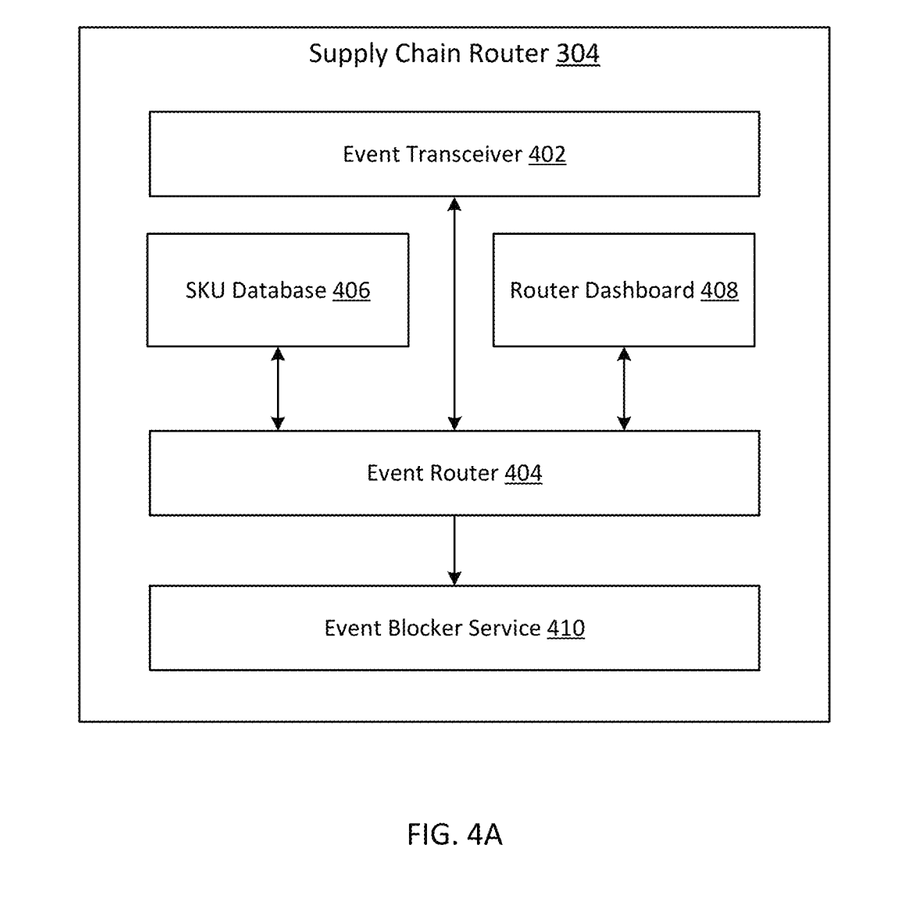
FIG. 4A illustrates an example block diagram of the supply chain router described in FIG. 3.

FIG. 4A illustrates an example block diagram of the supply chain router 304 described in FIG. 3. As illustrated, the supply chain router 304 includes an event transceiver 402, an event router 404, an SKU database 406, a router dashboard 408, and an event blocker service 410.

As described herein, the demand aware system 300 is included in an optimized supply chain system that may be built on top of an existing legacy supply chain system. Certain products may not be best suited to be processed by the event processing engine 306, and therefore will not be processed using the supply chain management system. In such embodiments, those products may be controlled by an existing legacy supply chain system (not shown). The supply chain router 304 therefore functions to identify whether an item represented by the demand signal is processed by the event processing engine 306 or a legacy supply chain system, and allows concurrent operation of both the supply chain management system described herein and a legacy supply chain system. The supply chain router 304 functions to selectively route demand signals to the event processing engine 306 or to block those demand signals that should be processed by the legacy supply chain system. Thus, the supply chain router 304 is a co-existent construct used to route the processing of a demand signal to either the event processing engine 306 such that replenishment of that item can be handled on a per unit basis, or it can be routed so that it is processed by a legacy supply chain system.

The event transceiver 402 accepts demand signals from the event receiver 302 described in FIG. 3. Accordingly, the event transceiver 402 receives demand signals from systems external to the demand aware system 300 including online ordering systems 208 and point of sale systems 210. The event receiver 302 also receives demand signals from systems internal to the demand aware system 300 including the inventory exception generator 312, inventory adjustment generator 314, and positioning event creator 316. The event transceiver 402 sends those demand signals to the event router 404.

The event router 404 determines whether the item represented by the demand signal can be controlled by the event processing engine 306 shown in FIG. 3. The event router 404 looks up the item SKU in the SKU database 406, which contains a list of items, represented by its SKU, that can be processed by the event processing engine 306. Alternatively or additionally, the SKU database 406 contains a list of SKUs that cannot be processed by the event processing engine 306. As described herein, each demand signal includes metadata that describes the item, including the item's Stock Keeping Unit (SKU) and the location of the change represented by the demand signal; as such, items can be controlled by different supply chain management systems not only on a per-SKU basis, but also on a per-location basis (e.g., in the event that fewer than all retail locations implement the supply chain management system described herein, rather than legacy systems). In some embodiments, the metadata may also include item information such as the item class and the department within which the item belongs. The event router 404 therefore looks up, in the SKU database 406, the SKU corresponding to each demand signal. If the particular item SKU identified in the demand signal metadata is listed in the SKU database 406, the event router 404 routes the demand signal to the event transceiver 402, which routes the demand signal to the event router 302 so that the demand signal may be routed to the event processing engine 306. Alternatively, the event router 404 may directly route the demand signal to the event processing engine 306. If, however, the item SKU is not listed in the SKU database 406, the event router 404 blocks that demand signal. In this example, any blocked demand signal would be processed by the legacy supply chain system. Such systems may, for example, handle items in bulk, or require substantial back room stock at retail locations due to uncertain demand and shipment of bulk product packages.

The router dashboard 408 is a user interface that allows employees to selectively add or remove SKUs from the SKU database 406. Accordingly, a retailer can continue to add new items to the SKU database 406 such that more inventory items may be controlled by the event processing engine 306 of the demand aware system 300. This therefore allows a retailer to slowly phase out legacy supply chain systems as more demand signals can be processed by the event processing engine 306.

In some embodiments, the event router 404 also converts demand signals before routing to the event transceiver 402. In particular, the event router 404 may convert the demand signals to an informative signal that is usable by the event processing engine 306. For example, the demand signals may be converted to a signal that describes the demand signal's impact to inventory at the particular store so that the event processing engine 306 may determine how to shift inventory to maintain item inventory as close to the desired on hand as possible, which may require shifting less than a bundle of inventory. The event router 404 may convert the signal so as to indicate the type of inventory change, which may describe, for example, whether the inventory change is due to a sale, a warehouse cancellation, product damage, etc. The event router 404 may further convert the demand signal to indicate the location of the change, the particular product that is impacted, and the net change in inventory at the retail store.

Figure 4B:
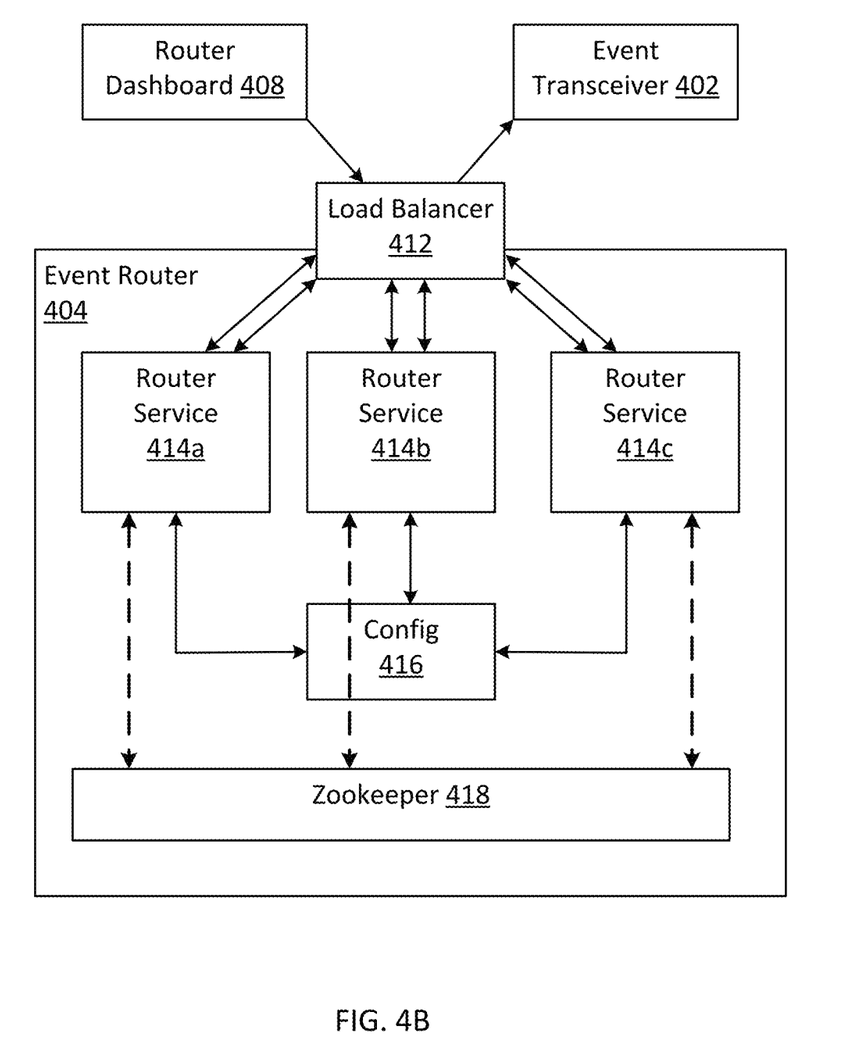
FIG. 4B illustrates another example block diagram of the supply chain router.

FIG. 4B illustrates an example block diagram of the event router 404 of the supply chain router 304. As illustrated, the event router 404 includes a load balancer 412, one or more router services 414*a*-414*c*, a configuration manager 416, and a zookeeper 418. The event router 404 further communicates with the router dashboard 408 and the event transceiver 402, as described in FIGS. 3 and 4A. As illustrated, the event router 404 receives demand signals from the event transceiver 402 and command signals (e.g., to update the SKU database) from the router dashboard 408 at the load balancer 412. The load balancer 412 receives all signals and re-routes those signals to one of the router services 414*a*-414*c*. Although only three router services are shown, more or fewer may be contemplated; a number of router services can be added or removed from the router 404 as are required to handle an observed volume of demand signals received at the demand aware system. A signal sent to a router service 414 triggers a lookup via a query application programming interface (API) passed to the configuration manager 416, which results in a lookup in the SKU database to determine whether that item may be processed by the event processing engine. If the item SKU exists in the SKU database. The router service 414, based on the lookup, routes the demand signal to the load balancer 412, and to the event transceiver 402 for forwarding to the event processing engine. If, alternatively, the item SKU does not exist in the SKU database, the router service 414 blocks the signal. In this example, a blocked signal (which may appear as a signal that is not sent back to the event transceiver 402 indicating the item exists) indicates that the demand signal should be controlled by the legacy supply chain system.

In some embodiments, each router service 414 also exposes an application programming interface (API) to the router dashboard 408, via which it can receive modifications to the SKU database. If the router service 414 receives, via the API, an update to the SKU database, the router service 414 can route that update to the configuration manager 416, which updates the SKU database accordingly (e.g., by adding SKU item numbers to the SKU database or by removing SKU item numbers from the SKU database). In some embodiments, the configuration manager 416 sends a confirm signal back through the router service 414, to the load balancer 412, and to the router dashboard 408.

In example embodiments, each of the router services 414*a-c* can include a cache from the SKU database, allowing for improved performance in lookup of SKU entries in response to demand signals. In such instances, queries received at the query API can be assessed relative to the cache, rather than forwarded to the configuration manager 416. However, it is noted that in certain cases, such cache entries may be out of date, for example based on receipt of a configuration change via a different router service. Accordingly, a zookeeper 418 functions as a synchronization service that manages signals routing through the event router 404, for cache coherency across router services 414*a-c*.

Figure 5:
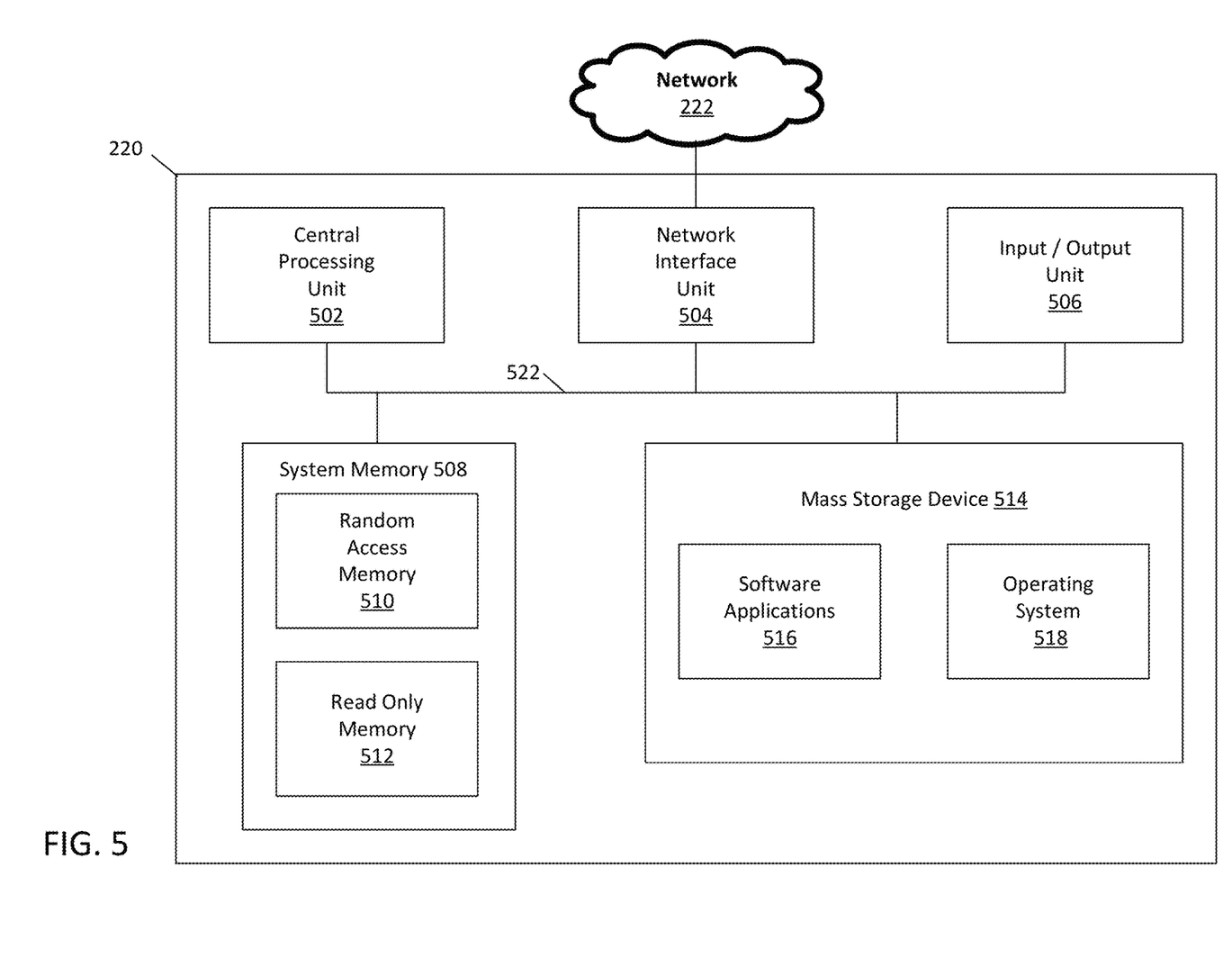
FIG. 5 illustrates an example block diagram of a computing system usable in the supply chain management system of FIG. 2.

Referring now to FIG. 5, an example block diagram of a computing system 220 is shown that is useable to implement aspects of the supply chain management system 200 of FIG. 2, including the demand aware system 300 shown and described with reference to FIGS. 2 and 3. In the embodiment shown, the computing system 220 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the computing system 220, such as during startup, is stored in the ROM 512. The computing system 220 further includes a mass storage device 514. The mass storage device 514 stores software instructions and data.

The mass storage device 514 is connected to the CPU 502 through a mass storage controller (not shown) connected to the system bus 522. The mass storage device 514 and its associated computer-readable storage media provide non-volatile, non-transitory data storage for the computing system 500. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 502 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 220.

According to various embodiments of the invention, the computing system 220 may operate in a networked environment using logical connections to remote network devices through a network 222, such as a wireless network, the Internet, or another type of network. The computing system 220 may connect to the network 222 through a network interface unit 504 connected to the system bus 522. It should be appreciated that the network interface unit 504 may also be utilized to connect to other types of networks and remote computing systems. The computing system 220 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the computing system 220 can store software instructions and data. The software instructions include an operating system 518 suitable for controlling the operation of the computing system 220. The mass storage device 514 and/or the RAM 510 also store software instructions, that when executed by the CPU 502, cause the computing system 220 to provide the functionality discussed in this document. For example, the mass storage device 514 and/or the RAM 510 can store software instructions that, when executed by the CPU 502, cause the computing system 220 to receive and analyze inventory and demand data.

Figure 6:
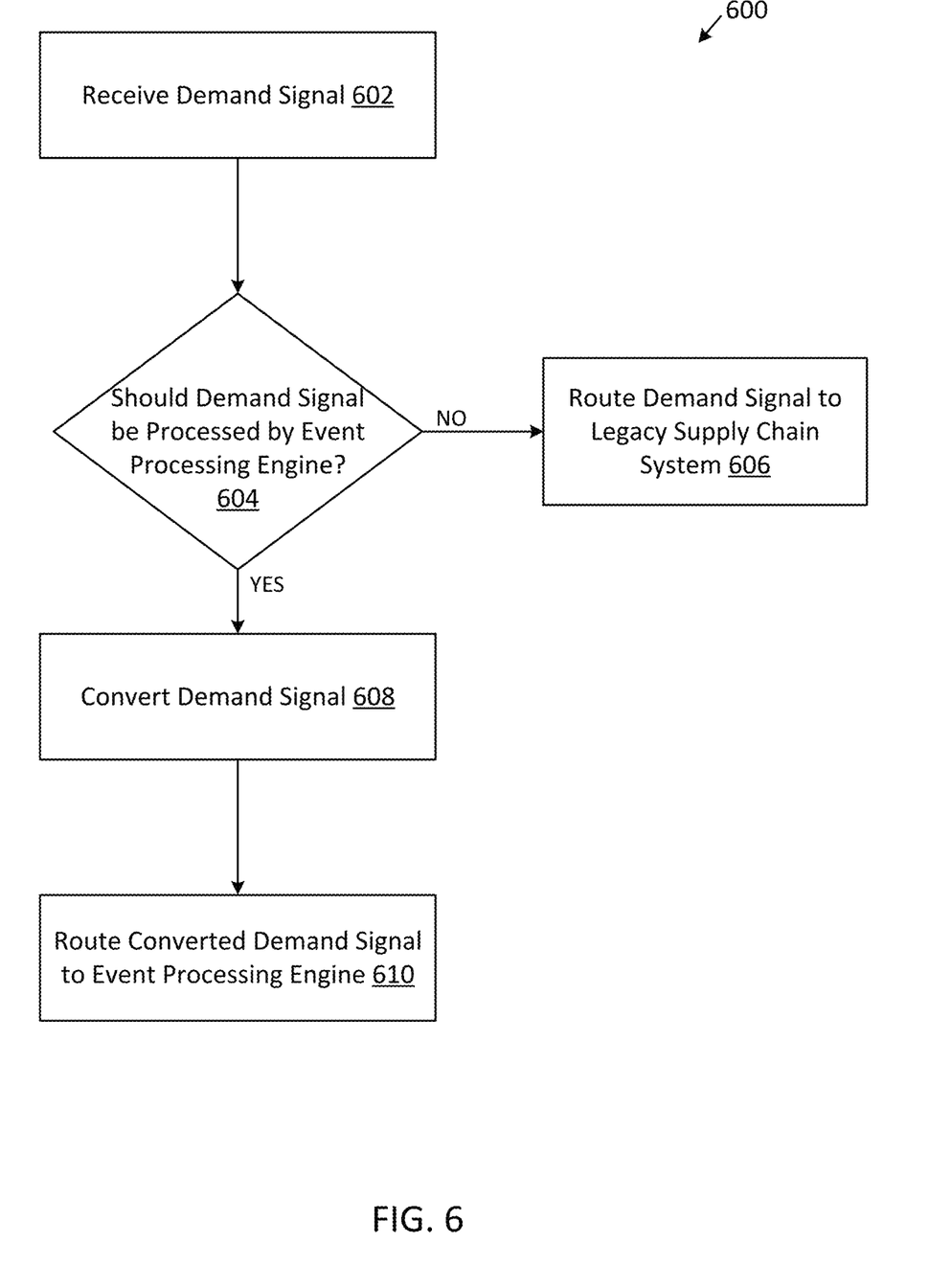
FIG. 6 is a flow chart of an example method 500 of managing inventory replenishment within a retail supply.

FIG. 6 is a flow chart of an example method 600 of managing inventory replenishment within a retail supply. In some embodiments, the method 600 is performed by the supply chain router 304 of the replenishment management engine as depicted in FIG. 3.

At operation 602, the supply chain router receives a demand signal from a receiver. A demand signal indicates a change in inventory of a particular item. Each demand signal includes metadata that describes the item, including the item's SKU, and the location of the change represented by the demand signal. In some embodiments, a demand signal originates from an online ordering system or one or more point of sale systems. Demand signals stemming from online ordering systems may affect inventory stored in a warehouse or flow center that is used to support online orders. The point of sale systems record sales that are made at stores, thus demand signals stemming from point of sale systems affect inventory at stores.

At operation 604, the supply chain router determines if the demand signal should be processed by the event processing engine. As described herein, the replenishment management system is an optimized supply chain system that may be built on top of an existing supply chain system. Certain products may not be best suited to be processed by the event processing engine but instead be better suited to be processed by a legacy supply chain management system. Thus, the supply chain router is a co-existent construct used to route the processing of a demand signal to either the event processing engine or a legacy supply chain system.

Thus, at operation 604, the supply chain router uses a query API to determine if the demand signal should be processed by the event processing engine or a legacy supply chain replenishment system. The query API may be used by the logic controller of the supply chain router to look up, on an SKU database, whether the particular item SKU identified in the demand signal metadata is listed therein. If the item SKU is not listed in the SKU database, (NO at operation 604), the logic controller routes the demand signal to the legacy supply chain replenishment system.

Alternatively, if the item SKU is listed in the SKU database, (YES at operation 604), the logic controller converts the demand signal before routing to the event processing engine. In particular, the demand signal converter may convert the demand signals to an informative signal that is usable by the event processing engine. For example, the demand signals may be converted to a signal that describes the demand signal's impact to inventory at the particular store so that the event processing engine may determine how to shift inventory to maintain item inventory as close to the desired on hand as possible. The demand signal converter may convert the signal so as to indicate the type of inventory change, which may describe, for example, whether the inventory change is due to a sale, a warehouse cancellation, product damage, etc. The demand signal converter may further convert the demand signal to indicate the location of the change, the particular product that is impacted, and the net change in inventory at the retail store.

At operation 610, the logic controller routes the converted demand signal to the event processing engine, which is described in further detail with reference to FIG. 6.

Figure 7:
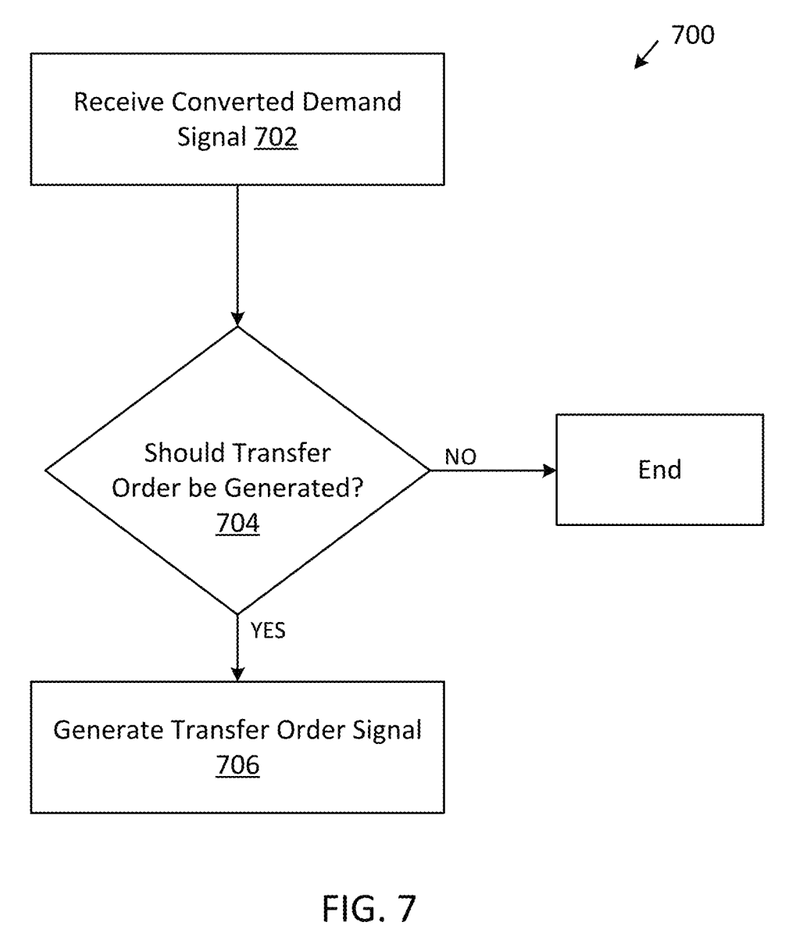
FIG. 7 is a flow chart of an example method 600 of determining whether to generate a transfer order in response to receiving one or more demand signals.

FIG. 7 is a flow chart of an example method 700 of determining whether to generate a transfer order in response to receiving one or more demand signals. One or more of the steps of this method may be optional in some embodiments. The method may be performed by the event processing engine 306 of FIG. 3.

At operation 702, the event processing engine accepts converted demand signals from the supply chain router representing items included in the SKU database that correspond to sold inventory. The event processing engine also accepts inputs from the desired on hand engine. As described herein, the desired on hand engine identifies the demand forecast for each particular item, at each store, during a given timeframe. In addition to obtaining forecasted demand for an item, the desired on hand engine also identifies optional additional inventory for each item that may be desired in a particular store.

At operation 704, the event processing engine determines whether a transfer order must be generated. A transfer order indicates whether inventory must be shipped to that store so at operation 704, the event processing engine uses the converted demand signals received from the supply chain router and the desired on hand signals from the desired on hand engine to determine whether new inventory items must be shipped to that store. In particular, the event processing engine identifies the last known total amount of inventory at the particular store from which the demand signal originated and subtracts the unit of inventory sold represented by the converted demand signal to arrive at the total number of inventory currently at the particular store. In some embodiments, this may be an aggregated number of units represented by multiple demand signals. The event processing engine then evaluates the desired on hand amount to determine whether additional inventory must be shipped to that particular store. If the desired on hand amount is less than the total amount of inventory currently at the store, (YES at operation 706), the event processing engine generates a transfer order signal that is passed to the transfer order generator.

Alternatively, if the desired on hand amount is greater than or equal to the total amount of inventory currently at the store (NO at operation 704), the method 700 ends and the event processing engine does not generate a transfer order signal.

Referring to FIGS. 1-7 generally, it is noted that there are a number of example advantages to the demand aware system of the present disclosure, both when used in the context of the supply chain management system 200 and when used in conjunction with both that type of system and a legacy supply chain management system. For example, the demand aware system enables a per-item, realtime supply chain management system to directly react to demand signals received from a point-of-sale system or online ordering system, which allows the supply chain management system instantly identify that a replacement item transfer should occur (assuming demand stays constant); this allows for quicker replenishment because that replacement item could be instantly eligible to be placed in a shipment having a predetermined route time, which may otherwise have been missed due to daily or less frequent aggregation of sales information from such point of sale systems. Furthermore, the demand aware system allows for seamless, gradual migration between co-resident supply chain management systems within an enterprise, and provides flexibility for different supply chain management systems at the item level as well as for isolated geographies or portions of the overall supply chain, which lowers the barriers to migration between supply chain management systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for managing supply chain operations in an enterprise having a retail store, the system comprising:
a computing system including a processor, and a memory communicatively coupled to the processor, the memory storing instructions executable by the processor to:
receive, at a supply chain router operating within a supply chain management system, a demand signal comprising a change in inventory of an item at a node within the enterprise, the item identified with a stock keeping unit (SKU);
determine, with the supply chain router, in real-time, whether to route the demand signal to an event processing engine of the supply chain management system by performing a lookup of the SKU in an SKU database;
upon determining that the SKU is absent from the SKU database, block the demand signal from the event processing engine and route the demand signal to a legacy supply chain system that is operating concurrently with the supply chain management system;
upon determining that the SKU is found in the SKU database, convert, with an event router operating within the supply chain management system, the demand signal to an informative signal that provides an indication of a type of inventory change, a particular product impacted by the change in inventory and a location of the inventory change, and route, using the event router, the demand signal to the event processing engine;
based on the informative signal, determine, with the event processing engine, whether additional items are required at the node to rebalance inventory by:
obtaining, for the item and the node, a current inventory and a demand forecast; and
determining whether the current inventory is less than or greater than the demand forecast; and
based on a determination that the current inventory is less than the demand forecast, automatically generate a transfer order by:
calculating a difference between the current inventory and the demand forecast; and
generating a transfer order equal to the difference, the transfer order being for one or more individual units of the item; and based on a determination that the current inventory is greater than or equal to the demand forecast, do not generate a transfer order.

2. The system for managing supply chain operations of claim 1, wherein determining whether additional inventory is required further comprises:
obtain, for the item and the node, optional additional inventory; and
determine that the current inventory is less than a combination of the demand forecast and the optional additional inventory.

3. The system for managing supply chain operations of claim 1, wherein the lookup of the SKU is performed using a query application programming interface (API) to determine if the item SKU is recorded in the SKU database.

4. The system of managing supply chain operations of claim 1, wherein the type of inventory change comprises one of an inventory change due to a sale, an inventory change due to a warehouse cancellation, or an inventory change due to product damage.

5. A method of managing inventory replenishment at a retail store by an event processing engine, the method comprising:
receiving, at a supply chain router operating within a supply chain management system, a demand signal corresponding to a sold inventory item from a point-of-sale system or online ordering system, the sold inventory item identified with a stock keeping unit (SKU);
determining, with the supply chain router in real-time, whether to route the demand signal to an event processing engine of the supply chain management system by performing a lookup the SKU of the sold inventory item in a SKU database;
upon determining that the SKU is absent from the SKU database, blocking the demand signal from the event processing engine and routing the demand signal to a legacy supply chain system that is operating concurrently with the supply chain management system;
upon determining that the SKU is found in the SKU database, converting, with an event router operating within the supply chain management system, the demand signal to an informative signal that provides an indication of a type of inventory change, a particular product impacted by the change in inventory and a location of the inventory change and routing, using the event router, the demand signal to the event processing engine;
based on the informative signal, receiving, for the retail store, a demand forecast and a current inventory for the sold inventory item;
determining, based on the demand forecast and current inventory, whether additional inventory is required at the retail store; and
based on a determination by the event processing engine that additional inventory is required, generate a transfer order for one or more individual units of the sold inventory item in a quantity less than a bundle of units.

6. The method of managing inventory replenishment of claim 5, wherein the demand forecast for the sold inventory item is obtained from a desired on hand engine.

7. The method of managing inventory replenishment of claim 6, wherein the demand forecast for the sold inventory item corresponds to the retail store during a predetermined timeframe.

8. The method of managing inventory replenishment of claim 5, further comprising receiving optional additional inventory for the sold inventory item.

9. The method of managing inventory replenishment of claim 8, wherein the optional additional inventory is obtained from the desired on hand engine.

10. The method of managing inventory replenishment of claim 5, wherein determining whether additional inventory is required further comprises:
obtaining, for the sold inventory item at the retail store, a current inventory; and
determining the current inventory is less than the demand forecast.

11. The method of managing inventory replenishment of claim 5, wherein determining whether additional inventory is required further comprises:
obtaining, for the sold inventory item at the retail store, a current inventory and optional additional inventory; and
determining the current inventory is less than a combination of the demand forecast and the optional additional inventory.

12. The method of managing inventory replenishment of claim 5, further comprising:
based on a determination that additional inventory is not required, do not generate a transfer order.

13. The method of managing inventory replenishment of claim 12, wherein based on a determination that additional inventory is not required further comprises:
obtaining, for the sold inventory item at the retail store, a current inventory; and
determining the current inventory is greater than or equal to the demand forecast.

14. The method of managing inventory replenishment of claim 5, wherein determining whether additional inventory is required further comprises:
identifying a lead time for when the additional inventory may arrive at the retail store.

15. A non-transitory computer-readable storage medium comprising computer-executable instructions which, when executed by a computing system, cause the computing system to perform a method of managing inventory replenishment at a retail store by an event processing engine, the method comprising:
receiving, at a supply chain router operating within a supply chain management system, a demand signal corresponding to a sold inventory item;
performing a lookup of a stock keeping unit (SKU) for the sold inventory item in a SKU database to determine if the sold inventory item can be processed by an event processing engine of the supply chain management system;
upon determining that the SKU is absent from the SKU database, blocking the demand signal from the event processing engine and routing the demand signal to a legacy supply chain system that is operating concurrently with the supply chain management system;
upon determining that that the SKU is found in the SKU database, converting, with an event router operating within the supply chain management system, the demand signal to an informative signal that provides an indication of a type of inventory change, a particular product impacted by the change in inventory and a location of the inventory change, and routing, using the event router, the demand signal to the event processing engine;

receiving at the event processing engine, for the retail store, a demand forecast for the sold inventory item;

based on the informative signal and the demand forecast, determining whether additional inventory is required; and based on a determination that additional inventory is required, automatically generate a transfer order.

16. The method of managing inventory replenishment of claim 15, wherein determining whether additional is required further comprises:

obtaining, for the sold inventory item at the retail store, a current inventory; and determining the current inventory is less than the demand forecast.

17. The method of managing inventory replenishment of claim 15, wherein determining whether additional inventory is required further comprises:

obtaining, for the sold inventory item at the retail store, a current inventory and optional additional inventory; and determining the current inventory is less than a combination of the demand forecast and the optional additional inventory.

* * * * *